(12) United States Patent
Aiyoshi et al.

(10) Patent No.: US 11,675,984 B2
(45) Date of Patent: Jun. 13, 2023

(54) CARD INSERTION UNIT AND CARD READER

(71) Applicant: NIDEC SANKYO CORPORATION, Nagano (JP)

(72) Inventors: Hiroyuki Aiyoshi, Nagano (JP); Masaya Fujimoto, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 39 days.

(21) Appl. No.: 17/362,872

(22) Filed: Jun. 29, 2021

(65) Prior Publication Data

US 2021/0406486 A1 Dec. 30, 2021

(30) Foreign Application Priority Data

Jun. 30, 2020 (JP) .............................. JP2020-112499

(51) Int. Cl.
*G06K 7/00* (2006.01)

(52) U.S. Cl.
CPC ................................ *G06K 7/0047* (2013.01)

(58) Field of Classification Search
CPC .... G06K 7/0047; G06K 7/0056; G06K 13/08; G06K 7/0021
USPC ................................................. 235/383, 385
See application file for complete search history.

(56) References Cited

U.S. PATENT DOCUMENTS

| 6,641,034 B1 * | 11/2003 | Oki ........................ G06K 13/08 |
| | | 235/491 |
| 9,740,890 B2 | 8/2017 | Watanabe et al. |
| 2017/0132437 A1 * | 5/2017 | Watanabe ............ G06K 7/0056 |
| 2017/0135175 A1 * | 5/2017 | Sugimoto .............. H05B 45/20 |

FOREIGN PATENT DOCUMENTS

WO    WO-0242990 A1 *    5/2002    ............. G06K 13/08

OTHER PUBLICATIONS

WO0242990A1, Card Gate Mechanism in Card Reader, English machine translation, 6 pages. (Year: 2022).*

* cited by examiner

*Primary Examiner* — Tuyen K Vo
(74) *Attorney, Agent, or Firm* — Hauptman Ham, LLP

(57) ABSTRACT

A card insertion unit is provided, which prevents the mixture of lights in different colors even with light sources to emit lights in different colors at the periphery of a card insertion slot. A card insertion unit, having a card insertion slot through which a card is inserted, includes: a plurality of light sources provided to surround the card insertion slot, when viewed in an insertion direction of the card, with a light emitting unit facing in a direction opposite to the insertion direction so as to each emit lights in multiple colors; a translucent cover member that is provided with the card insertion slot and is overlapped with the light sources in the direction opposite to the insertion direction; and a reflective member provided between the light sources and the card insertion slot to reflect light that is to travel from the light sources toward the card insertion slot.

12 Claims, 4 Drawing Sheets

CARD INSERTION UNIT AND CARD READER

RELATED APPLICATIONS

The present application claims priority to Japanese Application Number 2020-112499, filed Jun. 30, 2020, the disclosure of which is hereby incorporated by reference herein in its entirety.

BACKGROUND

Field of the Invention

At least an embodiment of the present invention relates to a card insertion unit and a card reader including the card insertion unit.

Description of the Related Documents

A card reader in Japanese Laid-open Patent Publication No. 2015-232822 includes a card insertion unit provided with a card insertion slot and a card reader main body that executes processing such as reading or writing of information from or to a card inserted through the card insertion slot. The card insertion unit includes a cover member that is made of translucent resin and is provided with the card insertion slot, a plurality of light sources provided on the back side of the cover member, and a light guide member that is provided between the cover member and the light sources and is configured to illuminate the periphery of the card insertion slot. As the light guide member makes uniform the light emitted by each of the light sources, the periphery of the card insertion slot is uniformly illuminated.

In the market of card readers, there is a need to improve the decorativeness of a card insertion unit with light sources provided to emit lights in different colors at the periphery of a card insertion slot. However, in a card insertion unit including a light guide member, the mixture of lights in different colors results in an undesirable appearance of the overall card insertion unit. Also, the light leaking into the card insertion slot and the mixture of lights in different colors at the card insertion slot result in an undesirable appearance of the card insertion slot. Therefore, there are disadvantages such that it is difficult to place the light sources that emit lights in different colors at the periphery of the card insertion slot and it is difficult to improve the decorativeness.

The object of at least an embodiment of the present invention is to provide a card insertion unit that prevents the mixture of lights in different colors even with the light sources provided to emit lights in different colors at the periphery of a card insertion slot and to provide a card reader including the card insertion unit.

SUMMARY

In order to solve the above-described disadvantage, according to at least an embodiment of the present invention, a card insertion unit, provided with a card insertion slot through which a card is inserted, includes: a plurality of light sources that are provided to surround the card insertion slot, when viewed in an insertion direction of the card, with a light emitting unit facing in a direction opposite to the insertion direction so as to each emit lights in multiple colors; a translucent cover member that is provided with the card insertion slot and is overlapped with the light sources in the direction opposite to the insertion direction; and a reflective member that is provided between the light sources and the card insertion slot to reflect light that is to travel from the light sources toward the card insertion slot.

According to at least an embodiment of the present invention, the light sources, which may emit lights in multiple colors, are provided inside the translucent cover member. Specifically, according to at least an embodiment of the present invention, as no light guide member is used, it is possible to prevent the mixture of lights in different colors around the card insertion slot even with the use of the light sources that emit lights in multiple colors. Further, according to at least an embodiment of the present invention, as the reflective member is provided between the light sources and the card insertion slot to reflect the light that is to travel from the light sources toward the card insertion slot, the light is prevented from leaking inside the card insertion slot, and the reflected light is guided to the front side of the cover member. Therefore, it is possible to prevent the mixture of lights in different colors inside the card insertion slot and to brightly illuminate the periphery of the card insertion slot. As a result, according to at least an embodiment of the present invention, as the light sources emitting lights in different colors may be provided at the periphery of the card insertion slot, the decorativeness of the card insertion unit may be improved.

According to at least an embodiment of the present invention, the cover member is preferably provided with a groove portion into which an end of the reflective member on an opposite side of the insertion direction is inserted in the direction opposite to the insertion direction. With this configuration, as the end of the reflective member on the opposite side of the insertion direction is inserted into the groove portion of the cover member, the reflective member may be easily provided between the light sources and the card insertion slot.

According to at least an embodiment of the present invention, a substrate having the light sources mounted on a surface thereof on an opposite side of the insertion direction is preferably included, and the cover member is preferably overlapped with the surface of the substrate on the opposite side of the insertion direction. With this configuration, the size of the card insertion unit may be reduced in the card insertion direction.

According to at least an embodiment of the present invention, the surface of the substrate on the opposite side of the insertion direction is preferably provided with a reflective layer. With this configuration, as the light reflected by the reflective layer is guided to the cover member, the periphery of the card insertion slot may be brightly illuminated.

According to at least an embodiment of the present invention, each of the light sources may include a light emitting diode to emit red light, a light emitting diode to emit green light, and a light emitting diode to emit blue light. In this case, according to at least an embodiment of the present invention, a light emitting diode control unit to control the light sources so as to change colors emitted from the light sources is preferably included. With this configuration, the light sources may emit lights in multiple colors, and the light sources may emit light in a variety of emission patterns.

According to at least an embodiment of the present invention, the card insertion unit and a card reader main body to which the card insertion unit is secured are included. With the card reader, there is no mixture of lights in different colors even when the periphery of the card insertion slot is illuminated in different colors, whereby the decorativeness of the card insertion unit may be improved.

According to at least an embodiment of the present invention, as it is possible to prevent the mixture of lights in different colors even with the light sources provided to emit lights in different colors at the periphery of a card insertion slot, the decorativeness of the card insertion unit may be improved.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

At least an embodiment of the present invention is described below with reference to the drawings.

Figure 1:
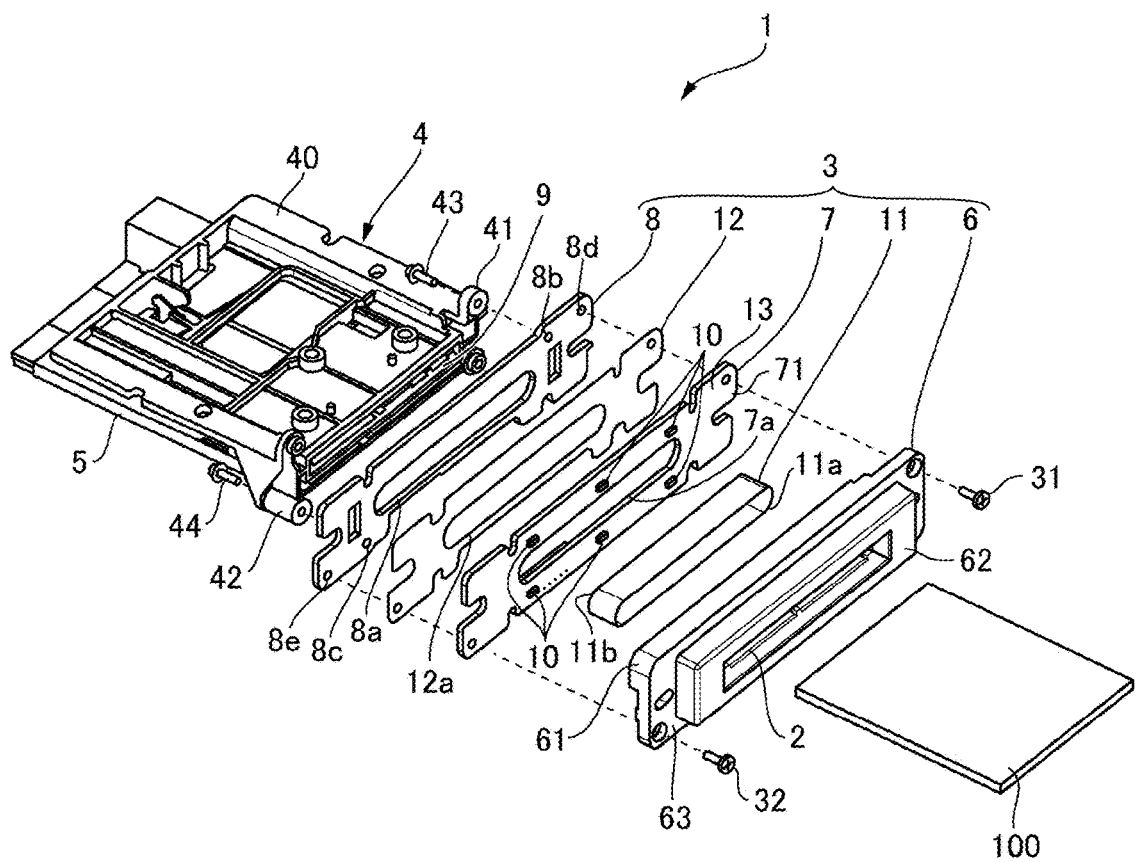
FIG. 1 is an exploded perspective view of a card reader to which at least an embodiment of the present invention is applied.
Figure 1:
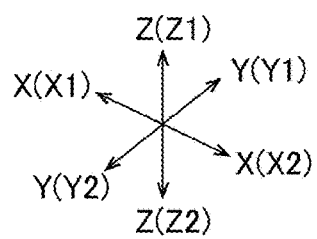
Figure 2:
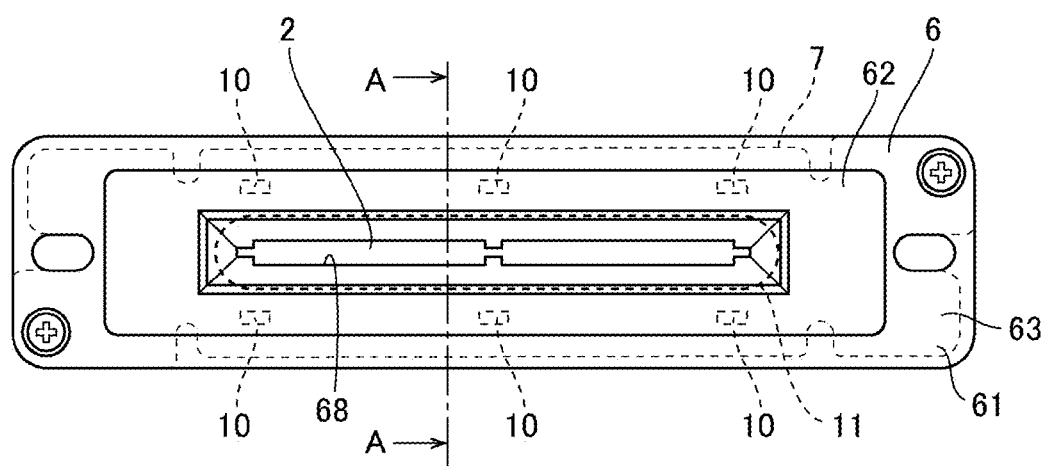
FIG. 2 is a front view of a card insertion unit illustrated in FIG. 1.
Figure 2:
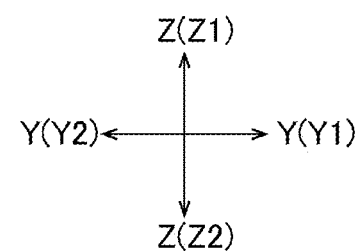
Figure 3:
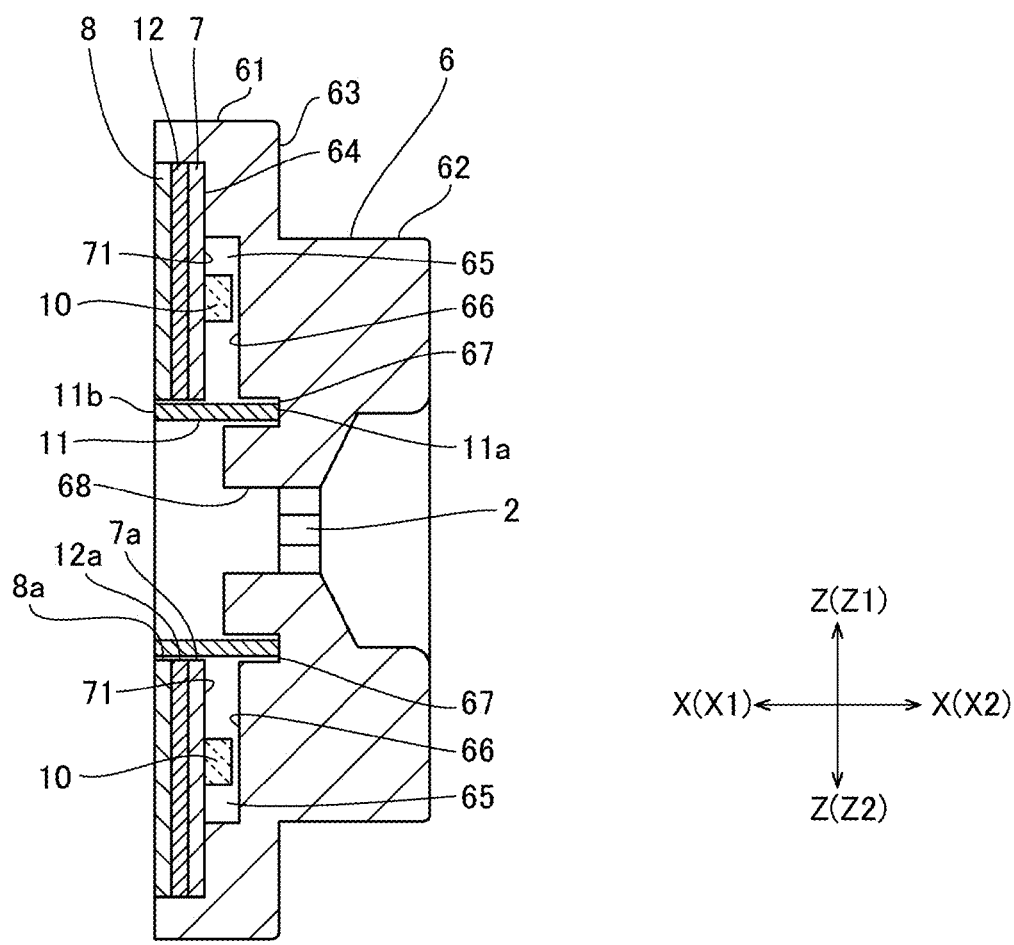
FIG. 3 is a cross-sectional view taken along A-A of FIG. 2.

FIG. 1 is an exploded perspective view of a card reader 1 to which at least an embodiment of the present invention is applied. FIG. 2 is a front view of a card insertion unit 3 illustrated in FIG. 1. FIG. 3 is a cross-sectional view taken along A-A of FIG. 2. In this description, the three directions of XYZ are perpendicular to each other. The X-direction is the front-back direction of the card reader 1. An X1-direction is the card insertion direction. That is, a card 100 is inserted into the card reader 1 in the X1-direction and is removed from the card reader 1 in an X2-direction. The Y-direction is the width direction of the card reader 1; the Y-direction on one side is a Y1-direction, and the Y-direction on the other side is a Y2-direction. The Z-direction is the height (thickness) direction of the card reader 1; the Z-direction on one side is a Z1-direction, and the Z-direction on the other side is a Z2-direction.

Overall Configuration

The card reader 1 having the present mode illustrated in FIG. 1 is a device that reads data recorded in the card 100 and records data in the card 100. For example, the card reader 1 is used by being installed in a game machine, or the like, provided in casinos, game arcades, etc.

The card 100 is, for example, a card made of vinyl chloride and having substantially a rectangular shape with a thickness of approximately 0.7 mm to 0.8 mm. The back surface of the card 100 is provided with a magnetic stripe (not illustrated) in which magnetic data is recorded. The card 100 is provided with a built-in IC chip, and the surface of the card 100 is provided with an external connection terminal (not illustrated) of the IC chip. The card 100 may be provided with either the magnetic stripe or the external connection terminal. The card 100 may be, for example, a PET (polyethylene terephthalate) card having a thickness of approximately 0.18 mm to 0.36 mm or a paper card having a predetermined thickness.

As illustrated in FIG. 1, the card reader 1 includes the card insertion unit 3 provided with a card insertion slot 2 for inserting the card 100 and a main body unit 4 provided with a card passage 9 communicating with the card insertion slot 2. The main body unit 4 includes a magnetic head that reads magnetic data recorded in the magnetic stripe of the card 100 inserted into the card passage 9 and writes magnetic data, an IC contact block that comes into contact with the external connection terminal of the IC chip of the card 100 to execute data communications with the card 100, and the like. A control board 5 is attached to the end of the main body unit 4 with respect to the Z2-direction. A CPU, or the like, that controls the card reader 1 is mounted on the control board 5. The card insertion unit 3 is attached to the end of the main body unit 4 with respect to the X2-direction.

Card Insertion Unit

The card insertion unit 3 includes a plurality of light sources 10, a rigid substrate 7 on which the light sources 10 are mounted, and a base plate 8 to which the rigid substrate 7 is secured. An insulating member 12 is provided between the rigid substrate 7 and the base plate 8. The card insertion unit 3 includes a cover member 6 provided with the card insertion slot 2 and a reflective member 11 that reflects light that is to travel from the light sources 10 toward the card insertion slot 2.

The base plate 8 is shaped like a flat plate having substantially a rectangular shape whose long side direction is in the Y-direction. The base plate 8 is made of a metal plate. The base plate 8 is in contact with boss portions 41 and 42 provided at the diagonal positions of a frame 40 of the main body unit 4 from the X2-direction. The boss portion 41 is provided at the corner between the Z1-direction and the Y1-direction in the frame 40, and the boss portion 42 is provided at the corner between the Z2-direction and the Y2-direction in the frame 40. The base plate 8 includes screw holes 8b and 8c that are formed at the positions overlapped with the boss portions 41 and 42 when viewed from the X-direction. The ends of metal screws 43 and 44 are inserted into the boss portions 41 and 42 from the X1-direction and fastened at the screw holes 8b and 8c so that the base plate 8 is secured to the frame 40. The center of the base plate 8 is provided with an opening 8a through which the card 100 passes. The opening 8a is formed to be oval with its longitudinal direction in the Y-direction.

The insulating member 12 is a resin member shaped like substantially a rectangular sheet whose long side direction is in the Y-direction. The center of the insulating member 12 is provided with an opening 12a through which the card 100 passes. The rigid substrate 7 is shaped like a flat plate having substantially a rectangular shape whose long side direction is in the Y-direction. The center of the rigid substrate 7 is provided with an opening 7a through which the card 100 passes. The opening 7a, the opening 8a, and the opening 12a have the same size and shape and are overlapped with the card insertion slot 2 in the X-direction. The opening 7a, the opening 8a, and the opening 12a constitute a conveyance passage through which the card 100 passes.

A white reflective layer 13 is provided on a surface 71 of the rigid substrate 7 on the side of the X2-direction. The reflective layer 13 reflects, toward the X2-direction, the light emitted from the light sources 10 toward the X1-direction. The reflective layer 13 may be any reflective surface that reflects light, and the color of the reflective layer 13 may be a color other than white. For example, the color of the reflective layer 13 may be silver.

The light sources 10 are mounted on the surface 71 of the rigid substrate 7 with light emitting units facing the X2-direction. More specifically, as illustrated in FIG. 2, the light sources 10 are provided on the surface 71 of the rigid substrate 7 so as to surround the card insertion slot 2 and the conveyance passage when viewed from the X-direction. In the present mode, the total number of light sources 10 is six; the three light sources 10 are provided around the opening 7a on the side of the Z1-direction, and the three light sources 10 are provided around the opening 7a on the side of the Z2-direction. The three light sources 10 provided around the opening 7a on the side of the Z1-direction are equally spaced in the Y-direction. The three light sources 10 provided around the opening 7a on the side of the Z2-direction are equally spaced in the Y-direction. Each of the three light sources 10 provided around the opening 7a on the side of the Z1-direction is in alignment, in the Z-direction, with the corresponding one of the three light sources 10 provided around the opening 7a on the side of the Z2-direction.

The light source 10 is a light emitting diode (LED) array in which an LED that emits red light, an LED that emits green light, and an LED that emits blue light are arrayed. The rigid substrate 7 on which the light sources 10 are mounted is electrically connected to the control board 5 via a cable, or the like. A LED control unit mounted on the control board 5 controls the emission intensities of the three LEDs in red, green, and blue so that the light sources 10 emit lights in multiple colors.

The cover member 6 is made of a resin material. The cover member 6 also has translucency. In the present mode, the cover member 6 is made of a translucent material in opaque white. The cover member 6 may be made of an opaque translucent material in a color other than opaque white, such as gray.

The cover member 6 includes a base portion 61 formed like a flat plate and substantially a rectangular frame and a projection portion 62 projecting from the base portion 61 toward the X2-direction. The projection portion 62 is shaped like substantially a rectangular cylinder having its axial direction in the X-direction and elongated in the Y-direction, and an inner peripheral wall 68 of the projection portion 62 forms the card insertion slot 2. A front surface 63 of the base portion 61 is shaped like substantially a rectangular frame surrounding the entire circumference of the projection portion 62.

The ends of screws 31 and 32 are inserted into the cover member 6 from the X2-direction and are fastened at screw holes 8d and 8e so that the cover member 6 is secured to the base plate 8 together with the rigid substrate 7 and the insulating member 12. The cover member 6 covers the light sources 10 and the rigid substrate 7 from the X2-direction.

In the present mode, the front surface 63 of the base portion 61 is a mounting surface for mounting the card reader 1 on a game machine. When the card reader 1 is mounted on the game machine, only the projection portion 62 is exposed on a front panel of the game machine. When the card reader 1 is mounted on the game machine, the front surface 63 of the base portion 61 is covered with a light-shielding member.

As illustrated in FIG. 3, the base portion 61 includes a first surface portion 64 with which the surface 71 of the rigid substrate 7 is overlapped in the X2-direction. The base portion 61 is provided with a recess portion 65 for accommodating the light sources 10. A bottom surface 66 of the recess portion 65 faces the light sources 10 in the X-direction. The base portion 61 is provided with a groove portion 67 into which an end 11a of the reflective member 11 on the side of the X2-direction is inserted. The groove portion 67 is an annular groove having an oval shape with its longitudinal direction in the Y-direction. The groove portion 67 has a shape slightly smaller than the opening 7a, the opening 8a, and the opening 12a.

As illustrated in FIG. 2, the width of the projection portion 62 in the Z-direction is wider than the width in which the light sources 10 are arranged in the Z-direction when viewed from the X-direction. That is, the light sources 10 are provided at the positions overlapped with the projection portion 62 when viewed from the X-direction.

As illustrated in FIGS. 1 and 2, the reflective member 11 has an oval shape that is elongated in the Y-direction and has a width in the X-direction when viewed from the X-direction. The reflective member 11 has an oval shape slightly smaller than the opening 7a, the opening 8a, and the opening 12a. As illustrated in FIG. 3, the reflective member 11 is provided between the light sources 10 and the card insertion slot 2 in the Z-axis direction, and the end 11a of the reflective member 11 on the side of the X2-direction is covered with the cover member 6. The end 11a of the reflective member 11 on the side of the X2-direction is inserted into the groove portion 67, and an end 11b of the reflective member 11 on the side of the X1-direction is inserted into the opening 7a, the opening 8a, and the opening 12a.

The reflective member 11 is made of metal or resin to reflect the light that is to travel from the light sources 10 toward the card insertion slot 2 and the conveyance passage. Specifically, as the light that is to travel from the light sources 10 toward the card insertion slot 2 and the conveyance passage is blocked by the reflective member 11, the light that is to travel from the light sources 10 toward the card insertion slot 2 and the conveyance passage does not pass through the card insertion slot 2 and the conveyance passage. In the present mode, the reflective member 11 is white. The reflective member 11 may be any member that reflects light, and the color of the reflective member 11 may be a color other than white. For example, the color of the reflective member 11 may be silver.

The card reader 1 according to the present mode is installed in a game machine provided in casinos, game arcades, or the like, and the card reader 1 is used while the card 100 is inserted into the card reader 1. When the card 100 is inserted into the card reader 1, the light source 10 emits light toward the cover member 6 so that the peripheral portion of the card insertion slot 2 of the card insertion unit 3 is illuminated. When the peripheral portion of the card insertion slot 2 of the card insertion unit 3 is illuminated, the inside of the card insertion slot 2 and the conveyance passage is dark as the light that is to travel from the light sources 10 toward the card insertion slot 2 and the conveyance passage is reflected by the reflective member 11.

Control on Light Sources

Figure 4:
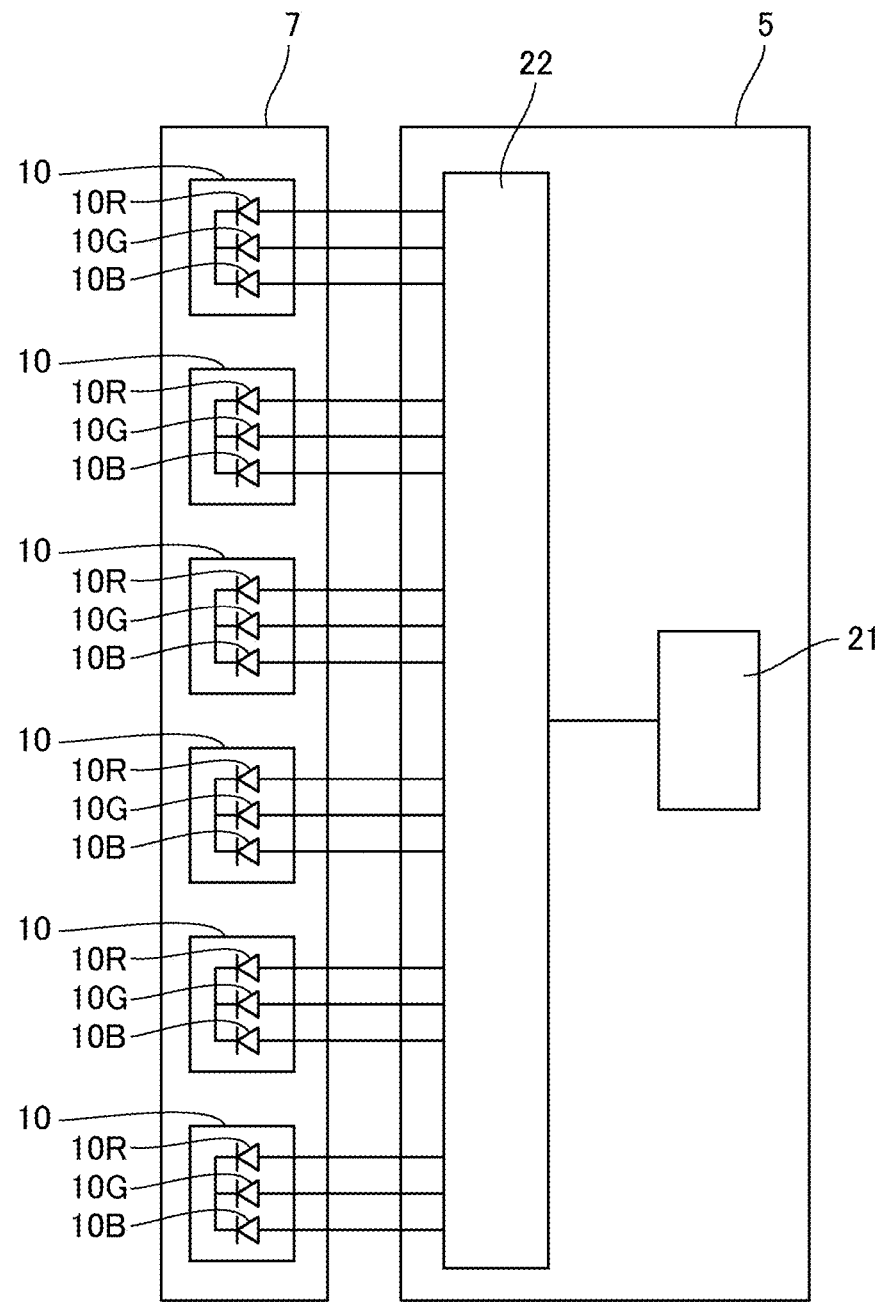
FIG. 4 is a control block diagram for controlling light sources.

Next, the control on the light sources 10 is described. FIG. 4 is a control block diagram for controlling the light sources 10. As illustrated in FIG. 4, the control board 5 has mounted thereon a CPU 21 that controls the card reader 1 and an LED control circuit 22 that is an LED control unit that controls the light sources 10. The light source 10 is an LED array including an LED 10R that emits red light, an LED 10G that emits green light, and an LED 10B that emits blue light. The LED control circuit 22 is coupled to each of the LED 10R, the LED 10G, and the LED 10B. The LED control circuit 22 controls the emission intensities of the LED 10R, the LED 10G, and the LED 10B of each of the light sources 10 based on a command from the CPU 21. The emission intensities of the light sources 10 are controlled by the LED control circuit 22 so that the light sources 10 emit lights in multiple colors.

In the present mode, the LED control circuit 22 may perform control such that the light sources 10 emit lights in six colors, i.e., green, light blue, blue, purple, red, and yellow. Therefore, for example, the LED control circuit 22 may perform control such that, among the six light sources 10, the two light sources 10 emit red light, the two light sources 10 emit green light, and the two light sources 10 emit blue light. Also, the LED control circuit 22 may perform control such that, among the six light sources 10, the three light sources 10 emit red light and the three light sources 10 emit green light.

The LED control circuit 22 may control all the six light sources 10 to emit lights in different colors and sequentially switch the emission in green, light blue, blue, purple, red, and then yellow so as to change the color of each of the light sources 10. That is, the LED control circuit 22 may control the emission of each of the light sources 10 so as to allow the light sources 10 to emit light in a variety of emission patterns. Accordingly, the card reader 1 according to the present mode may cause the peripheral portion of the card insertion slot 2 of the card insertion unit 3 to be illuminated in a variety of emission patterns so as to improve the decorativeness of the card insertion unit 3.

Advantage of the Present Mode

The present mode includes the light sources 10 that are provided to surround the card insertion slot 2, when viewed in the X1-direction, with the light emitting units facing the X2-direction so as to each emit lights in multiple colors, the translucent cover member 6 that is provided with the card insertion slot 2 and overlapped with the light sources 10 in the X2-direction, and the reflective member 11 that is provided between the light sources 10 and the card insertion slot 2 to reflect the light that is to travel from the light sources 10 toward the card insertion slot 2. As no light guide member is used, it is possible to prevent the mixture of lights in different colors around the card insertion slot 2 even with the use of the light sources that emit lights in multiple colors. According to at least an embodiment of the present invention, as the reflective member 11 is provided between the light sources 10 and the card insertion slot 2 to reflect the light that is to travel from the light sources 10 toward the card insertion slot 2, the light is prevented from leaking inside the card insertion slot 2, and the reflected light is guided to the front side of the cover member 6. Therefore, it is also possible to prevent the mixture of lights in different colors inside the card insertion slot 2 and to brightly illuminate the periphery of the card insertion slot 2. As a result, in the present mode, as the light sources 10 emitting lights in different colors may be provided at the periphery of the card insertion slot 2, the decorativeness of the card insertion unit 3 may be improved.

According to the present mode, the cover member 6 is provided with the groove portion 67 into which the end 11a of the reflective member 11 on the side of the X2-direction is inserted in the X2-direction. As the end 11a of the reflective member 11 on the side of the X2-direction is inserted into the groove portion 67 of the cover member 6, the reflective member 11 may be easily provided between the light sources 10 and the card insertion slot 2.

According to the present mode, the rigid substrate 7 with the light sources 10 mounted on the surface 71 on the side of the X2-direction is provided, and the cover member 6 is overlapped with the surface 71 of the rigid substrate 7. Thus, the size of the card insertion unit 3 may be reduced in the card insertion direction.

According to the present mode, the reflective layer 13 is provided on the surface 71 of the rigid substrate 7. Thus, as the light reflected by the reflective layer 13 is guided to the cover member 6, the periphery of the card insertion slot 2 may be brightly illuminated.

According to the present mode, each of the light sources 10 includes the LED 10R that emits red light, the LED 10G that emits green light, and the LED 10B that emits blue light. The present mode includes the LED control circuit 22 that controls the light sources 10 so as to change the colors emitted from the light sources 10. Thus, the light sources 10 may emit lights in multiple colors, and the light sources 10 may emit lights in a variety of emission patterns.

Modification

In the above-described embodiment, the end 11a of the reflective member 11 on the side of the X2-direction is inserted into the groove portion 67; however, this configuration is not a limitation. For example, a configuration may be such that the reflective member 11 is attached to the inner peripheral wall 68 with an adhesive, or the like. Even with this configuration, the light that is to travel from the light sources 10 toward the card insertion slot 2 is reflected by the reflective member 11. Thus, it is possible to prevent the mixture of lights in different colors at the card insertion slot 2 and to brightly illuminate the periphery of the card insertion slot 2.

What is claimed is:

1. A card insertion unit having a card insertion slot configured to receive a card, the card insertion unit comprising:
    a plurality of light sources that surround the card insertion slot, when viewed in an insertion direction of the card, with a light emitting unit facing in a direction opposite to the insertion direction so as to each emit lights in multiple colors;
    a translucent cover member that covers the card insertion slot and is overlapped with the light sources in the direction opposite to the insertion direction;
    a reflective member between the light sources and the card insertion slot to reflect light that is to travel from the light sources toward the card insertion slot; and
    a substrate having the plurality of light sources mounted on a surface of the substrate on an opposite side of the insertion direction, wherein the reflective member comprises:
    (i) a cylindrical shape which surrounds the circumference of the card insertion slot, and
    (ii) a width reaching the cover member and the opening of the substrate in the insertion direction.

2. The card insertion unit according to claim 1, wherein the cover member comprises a groove portion configured to receive, in the direction opposite to the insertion direction, an end of the reflective member on an opposite side of the insertion direction.

3. The card insertion unit according to claim 1, wherein the cover member overlaps with the surface of the substrate on the opposite side of the insertion direction.

4. The card insertion unit according to claim 3, wherein the surface of the substrate on the opposite side of the insertion direction comprises a reflective layer.

5. The card insertion unit according to claim 1, wherein each of the light sources comprises a light emitting diode to emit red light, a light emitting diode to emit green light, and a light emitting diode to emit blue light.

6. The card insertion unit according to claim 5, comprising a light emitting diode control unit to control the light sources so as to change colors emitted from the light sources.

7. A card reader comprising:
    the card insertion unit according to claim 1; and
    a card reader main body configured to secure the card insertion unit.

8. The card insertion unit according to claim 2, wherein the cover member is overlapped with the surface of the substrate on the opposite side of the insertion direction.

9. The card insertion unit according to claim 8, wherein the surface of the substrate on the opposite side of the insertion direction comprises a reflective layer.

10. The card insertion unit according to claim 9, wherein each of the light sources comprises a light emitting diode to emit red light, a light emitting diode to emit green light, and a light emitting diode to emit blue light.

11. The card insertion unit according to claim 10, comprising a light emitting diode control unit to control the light sources so as to change colors emitted from the light sources.

12. A card reader comprising:
    the card insertion unit according to claim 11; and
    a card reader main body configured to secure the card insertion unit.

\* \* \* \* \*